US006318186B1

(12) United States Patent
Smith et al.

(10) Patent No.: US 6,318,186 B1
(45) Date of Patent: Nov. 20, 2001

(54) TYPE IDENTIFICATION AND PARAMETER SELECTION FOR DRIVE CONTROL IN A CORIOLIS FLOWMETER

(75) Inventors: Richard L. Smith, Lafayette; Brian T. Smith, Johnston, both of CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/344,841

(22) Filed: Jun. 28, 1999

(51) Int. Cl.[7] ........................................ G01F 1/84
(52) U.S. Cl. ........................................ 73/861.356
(58) Field of Search ................ 73/861.354, 861.355, 73/861.356, 861.357, 861

(56) References Cited

U.S. PATENT DOCUMENTS 4,817,488 * 4/1989 Hargarten et al. ............... 73/861.38
4,823,614 * 4/1989 Dahlin .............................. 73/861.357
4,934,196 * 6/1990 Romano .......................... 73/861.356
5,321,991   6/1994 Kalotay .
5,555,190   9/1996 Derby et al. .
5,734,112   3/1998 Bose et al. .

FOREIGN PATENT DOCUMENTS

3738018 A1   5/1989 (DE) .
0 866 319 A1 9/1998 (EP) .

* cited by examiner

*Primary Examiner*—Max Noori
(74) *Attorney, Agent, or Firm*—Chrisman, Bynum & Johnson, P.C.

(57) ABSTRACT

A system for initializing parameters of a transmitter connected to a Coriolis flowmeter. This invention applies initial drive signals to a drive circuit which causes a flow tube to vibrate. The type of the flow tube is then determined from signals received from pick-off sensors associated with the flow tube. Parameters for generation of said drive signals are then set based upon the type of said flow tube.

9 Claims, 4 Drawing Sheets

TYPE IDENTIFICATION AND PARAMETER SELECTION FOR DRIVE CONTROL IN A CORIOLIS FLOWMETER

FIELD OF THE INVENTION

This invention relates to electronic components for controlling a drive signal in an apparatus that measures properties of material flowing through at least one vibrating conduit in the apparatus. More particularly, this invention relates to a system that determines parameters for generating a drive signal from the frequency of oscillation of a vibrating conduit.

PROBLEM

It is known to use Coriolis effect mass flowmeters to measure mass flow and other information for materials flowing through a conduit in the flowmeter. Exemplary Coriolis flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith et al. These flowmeters have one or more conduits of straight or curved configuration. Each conduit configuration in a Coriolis mass flowmeter has a set of natural vibration modes, which may be of a simple bending, torsional or coupled type. Each conduit is driven to oscillate at resonance in one of these natural modes. Material flows into the flowmeter from a connected pipeline on the inlet side of the flowmeter, is directed through the conduit or conduits, and exits the flowmeter through the outlet side of the flowmeter. The natural vibration modes of the vibrating, material filled system are defined in part by the combined mass of the conduits and the material flowing within the conduits.

When there is no flow through the flowmeter, all points along the conduit oscillate due to an applied driver force with identical phase or small initial fixed phase offset which can be corrected. As material begins to flow, Coriolis forces cause each point along the conduit to have a different phase. The phase on the inlet side of the conduit lags the driver, while the phase on the outlet side of the conduit leads the driver. Pick-off sensors on the conduit(s) produce sinusoidal signals representative of the motion of the conduit(s). Signals output from the pick-off sensors are processed to determine the phase difference between the pick-off sensors. The phase difference between two pick-off sensor signals is proportional to the mass flow rate of material through the conduit(s).

It is a problem that sometimes a flow is sporadic and contains entrained air. This entrained air causes the vibrations of the tubes to change amplitude. This can cause errors in the measured properties of the flowing material, such as mass flow. This is especially true in a straight flow tube configuration because straight flow tubes must be driven to vibrate at a much high frequency than flow tubes of a curved configuration and any disruption of the vibration of the straight flow tubes can more adversely affect calculations of the properties.

A transmitter generates a drive signal to operate the driver and determines a mass flow rate and other properties of a material from signals received from the pick-off sensors. A conventional transmitter is made of analog circuitry which is designed to generate the drive signal and detect the signals from the pick-off sensors. Analog transmitters have been optimized over the years and have become relatively cheap to manufacture. It is therefore desirable to design Coriolis flowmeters that can use conventional transmitters.

It is a problem that conventional transmitters must work with signals in a narrow range of operating frequencies. This range of operating frequencies is typically between 20 Hz and 200 Hz. This limits the designers to generating a narrow range of drive signals that will resonate the flow tubes at these frequencies. Therefore, it is impossible to use a conventional transmitter to generate the drive signals for some flowmeters, such as a straight tube flowmeter, which operate in a higher frequency range of 300 Hz–800 Hz. Therefore, a conventional transmitter cannot be used to generate the drive signal for straight tube flowmeters.

Those skilled in the Coriolis flowmeter art desire to design a transmitter that can be used with several different types of flowmeters. This would allow the manufacturers to take advantage of economies of scale to produce less expensive transmitters for flowmeters. A digital signal processor is desirable because the higher demand in measurement resolution and accuracy put on analog electronic components by flowmeters operating at higher frequencies, such as straight tube designs, are avoided by the digitalization of signals from the pick-offs as the signals are received by the transmitter. Furthermore, the instructions for signaling processes used a digital processor may be modified to operate at several different frequencies for both determining the properties of a material and generating the drive signals.

SOLUTION

The above and other problems are solved and an advance in the art is made by the provision of a system that initializes the parameters of a drive signal in a transmitter of a Coriolis flow meter. The system of this invention is comprised of processes that are stored in a memory and executed by a processor in order to generate drive signals for a driver of a vibrating conduit. Alternatively, the processes of this invention could also be performed by analog circuits. The processes of this invention allow a transmitter to determine the type of flow tube configuration that is attached to the transmitter and then set the parameters needed to generate the drive signals. This invention also uses a third parameter of integral drive gain to allow for better control of the drive signal in order to gain more robust control of the vibration of the flow tubes.

In a preferred embodiment of this invention, the system is provided by a digital signal processor such as the Texas Instruments TM3205xx, Analog Devices ADSP21xx, or Motorola 5306x. The processes of this invention are stored as instructions in a memory connected to the digital signal processor. The digital signal processor reads and executes the instructions to perform the processes of this invention.

The process begins by the flow tube being vibrated by an initial drive signal. The frequency of vibration of the flow tube is then determined. From the frequency of vibration, the type of flow tube is determined. A pre-stored set of parameters is then set as the parameters used to generate the drive signal.

The parameters include an integral drive gain component. The integral gain component controls the error between a set point and an actual target. This allows for a more robust control of the drive signal which allows the amplitude of the vibration to be more precise. This allows optimal power to be supplied to the sensor even under adverse flow conditions.

DESCRIPTION OF THE DRAWINGS

The present invention can be understood from the following detailed description and the following drawings.

DETAILED DESCRIPTION

Figure 1:
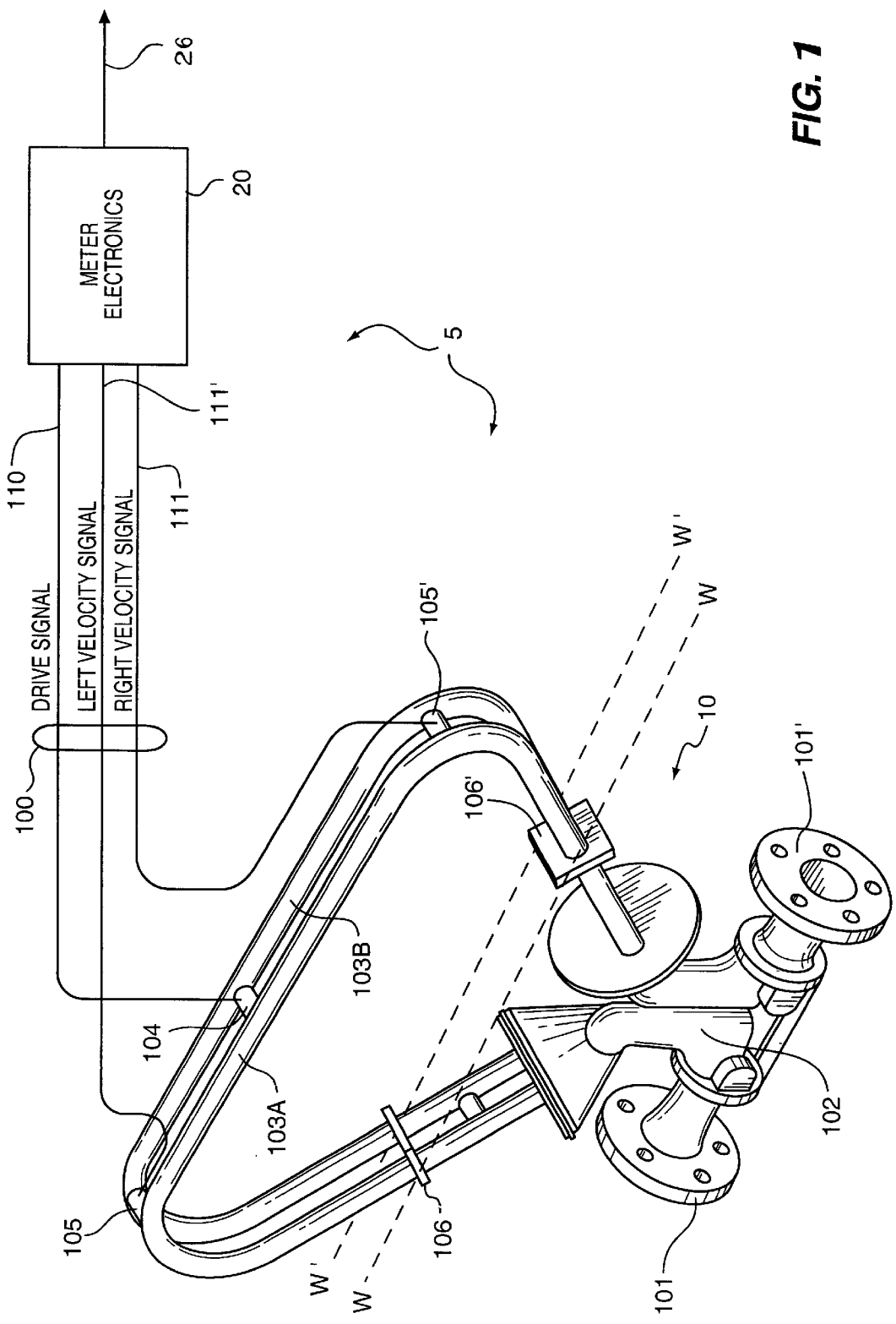
FIG. 1 illustrating a dual tube Coriolis Flowmeter having a digital transmitter that performs the processes for parameter initialization of this invention.

The present invention is described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure is thorough and complete, and fully conveys the scope of the invention to those skilled in the art. In the drawings, like numbers refer to like elements throughout.

Coriolis Flowmeter in General—FIG. 1

FIG. 1 shows a Coriolis flowmeter 5 comprising a Coriolis flowmeter assembly 10 and transmitter 20. Transmitter 20 is connected to meter assembly via leads 100 to provide density, mass flow rate, volume flow rate, totalized mass flow, and other information over path 26. Coriolis flowmeter 5 is described although it is apparent to those skilled in the art that the present invention could be practiced in conjunction with any apparatus having a vibrating conduit to measure properties of material. A second example of such an apparatus is a vibrating tube densitometer which does not have the additional measurement capability provided by a Coriolis mass flowmeter.

Flowmeter assembly 10 includes a pair of flanges 101 and 101', manifold 102 and conduits 103A and 103B. Driver 104, pick-off sensor 105 and pick-off sensor 105' are connected to conduits 103A and 103B. Brace bars 106 and 106' serve to define the axis W and W' about which each conduit oscillates.

When flowmeter 10 is inserted into a pipeline system (not shown) which carries the process material that is being measured, material enters meter assembly 10 through flange 101, passes through manifold 102 where the material is directed to enter conduits 103A and 103B, flows through conduits 103A and 103B and back into manifold 102 from where it exits meter assembly 10 through flange 101'.

Conduits 103A and 103B are selected and appropriately mounted to the manifold 102 so as to have substantially the same mass distribution, moments of inertia and elastic modules about bending axes W—W and W'—W', respectively. The conduits extend outwardly from the manifold in an essentially parallel fashion.

Conduits 103A–103B are driven by driver 104 in opposite directions about their respective bending axes W and W' and at what is termed the first out of phase bending mode of the flowmeter. Driver 104 may comprise any one of many well known arrangements, such as a magnet mounted to conduit 103A and an opposing coil mounted to conduit 103B and through which an alternating current is passed for vibrating both conduits. A suitable drive signal is applied by meter electronics 20, via lead 110, to driver 104.

Transmitter 20 receives the left and right velocity signals appearing on leads 111 and 111', respectively. Transmitter 20 produces the drive signal appearing on lead 110 and causing driver 104 to vibrate tubes 103A and 103B. Transmitter 20 processes the left and right velocity signals to compute the mass flow rate and the density of the material passing through meter assembly 10. This information is applied to path 26.

It is known to those skilled in the art that Coriolis flowmeter 5 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only a single feedback signal since a density measurement requires only the measurement of frequency and a phase measurement is not necessary. The descriptions of the present invention herein apply equally to vibrating tube densitometers.

Figure 2:
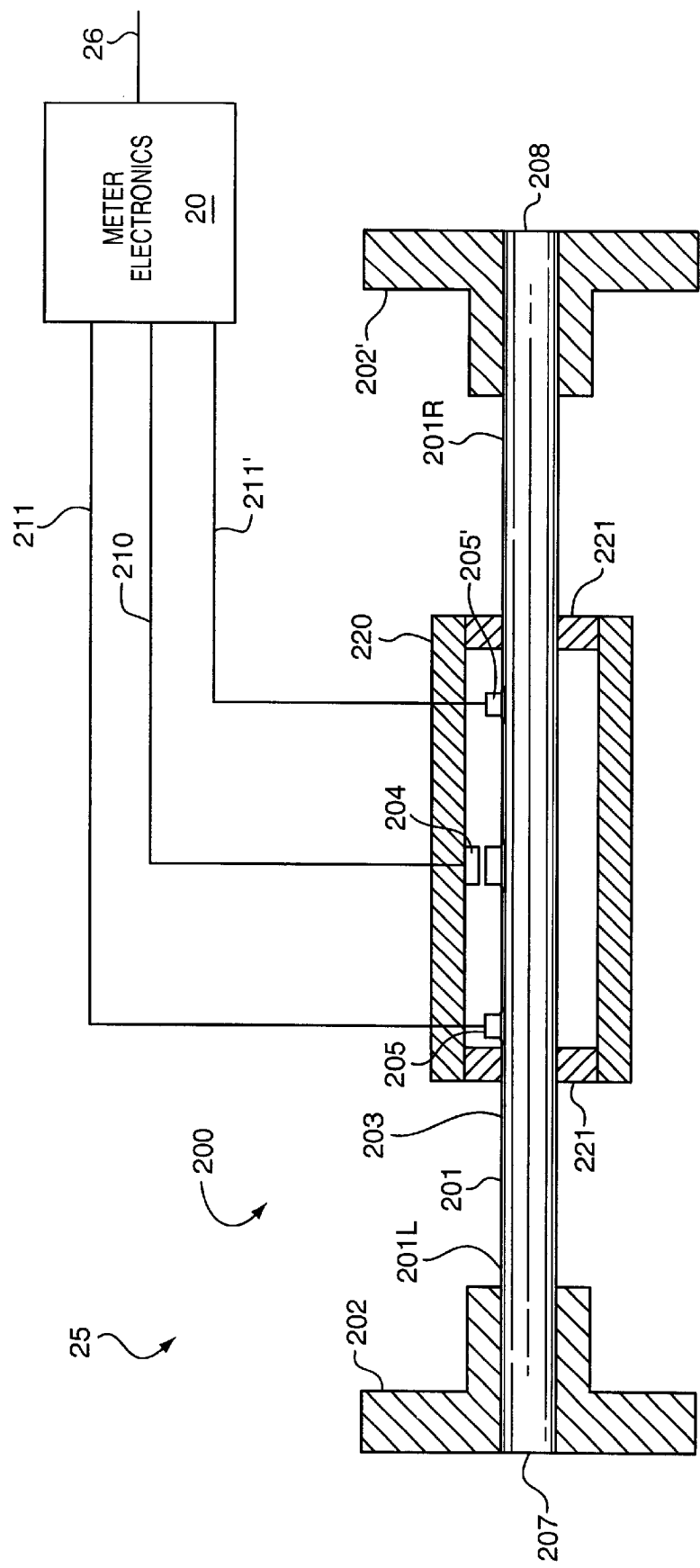
FIG. 2 illustrating a straight tube Coriolis flow meter having a digital transmitter that performs the processes for parameter initialization of this invention.

A Straight Tube Coriolis Flowmeter—FIG. 2

FIG. 2 discloses a straight tube Coriolis flowmeter 25. Straight tube Coriolis flowmeter 25 is comprised of Coriolis sensor 200 and associated meter electronics 20. The flow tube 201 includes a left end portion thereof designated 201L in a right end portion thereof designated 201R. Flow tube 201 and its end portions extend the entire length of the flowmeter from the input end 207 of flow tube 201 to the output end 208 of the flow tube. The balance bar 220 is connected at its ends to flow tube 201 by brace bar 221.

Left end portion 201L of flow tube 201 is affixed to inlet flange 202 and right end portion 201R is affixed to outlet flange 202'. Inlet flange 202 and outlet flange 202' connect Coriolis sensor 200 to a pipeline.

In a well known conventional manner, a driver 204, a left pick off 205 and a right pick off 205' are coupled to flow tube 201 and balance bar 220. Driver 204 receives signals over path 210 from meter electronics 20 to cause driver 204 to vibrate flow tube 201 and balance bar 220 and phase opposition at the resonant frequency of the material filled flow tube 201. The oscillation of vibrating flow tube 201 together with the material flow therein induces Coriolis deflections in the flow tube in a well known manner. These Coriolis deflections are detected by pick offs 205 and 205' with the outputs of these pick offs being transmitted over conductors 211 and 211' to meter electronics 20.

Figure 3:
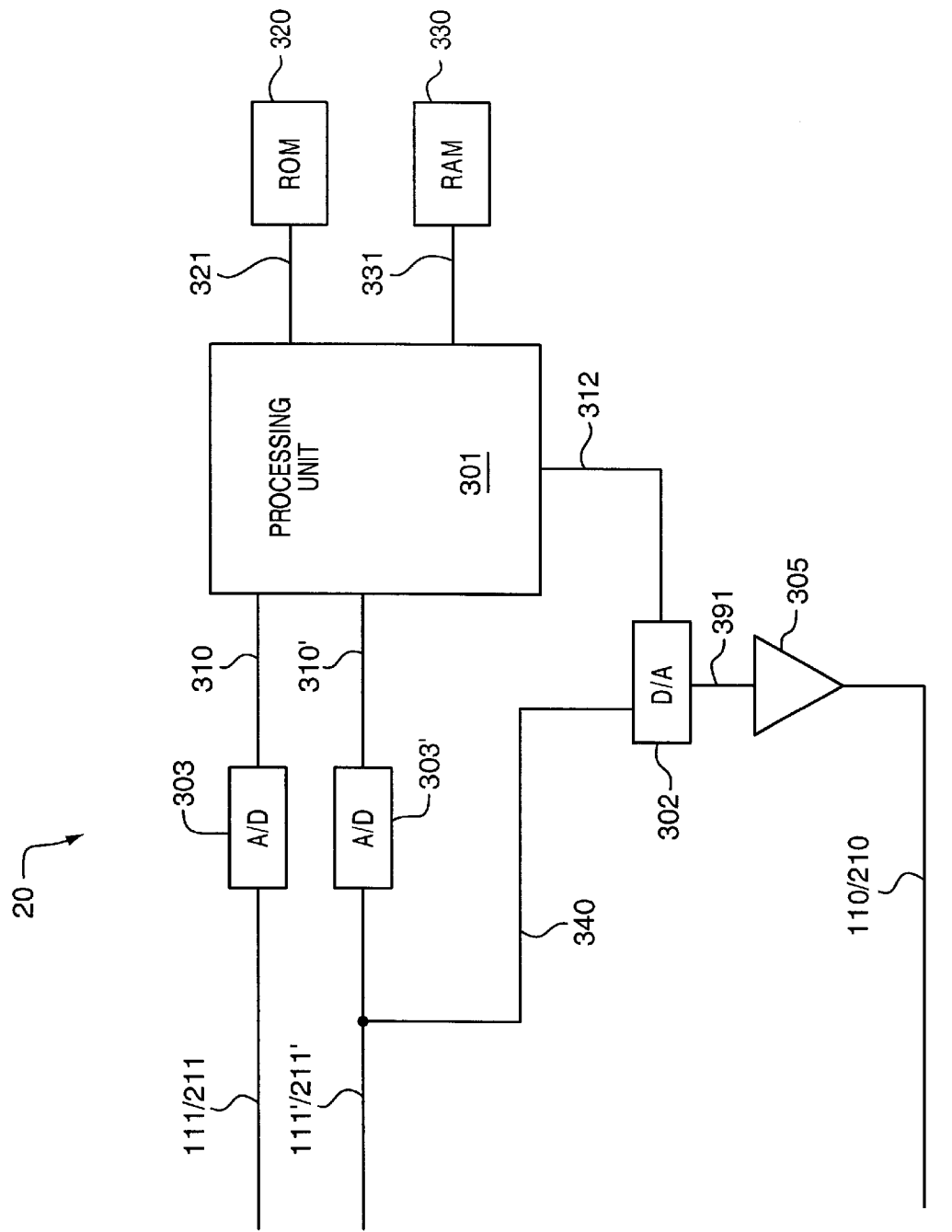
FIG. 3 illustrating a block diagram of a digital signal transmitter.

A Digital Transmitter 20—FIG. 3.

FIG. 3 illustrates of the components of a digital transmitter 20. Paths 111–111'/211–211' transmit the left and right velocity signals from flowmeter assembly 10/200 to transmitter 20. The velocity signals are received by analog to digital (A/D) convertors 303–303' in meter electronic 20. A/D convertors 303–303' convert the left and right velocity signals to digital signals usable by processing unit 301 and transmits the digital signals over paths 310–310'. Although shown as separate components, A/D convertor 303–303' may be a signal convertor, such a CS4218 Stereo 16-bit codec chip manufactured by Crystal Semi Inc. The digital signals are carried by paths 310–310' to processor 301. One skilled in the art will recognize that any number of pick-offs and other sensors, such as an RTD sensor for determining the temperature of the flow tube, may be connected to processor 301.

Driver signals are transmitted over path 312 which applies the signals to digital to analog (D/A) convertor 302. D/A convertor 302 also receives voltage from one of pick-offs 105–105'/205–205' over path 340. The drive signals include instructions for modifying the voltage received over path 340 to generate an analog drive signal. D/A convertor 302 is a common D/A convertor such as the AD7943 chip produced by Analog Devices. The analog signals from D/A convertor 302 are applied to amplifier 305 via path 391. Amplifier 305 generates a drive signal of the proper amplitude and applies the drive signal to driver 104–204 via path 110–210. Amplifier 305 may be a current amplifier or a voltage amplifier.

The signal either current or voltage generated by D/A convertor 302 depends on the type of amplifier 305. Path 26 carries signals to input and output means (not shown) which allow transmitter to receive data from and convey data to an operator.

Processing unit 301 is a micro-processor, processor, or group of processors that reads instructions from memory and executes the instructions to perform the various functions of the flowmeter. In a preferred embodiment, processor 301 is a ADSP-2185L microprocessor manufactured by Analog Devices. The functions performed include but are not limited to computing mass flow rate of a material, computing volume flow rate of a material, and computing density of a material from a Read Only Memory (ROM) 320 via path 321. The data as well as instructions for performing the various functions are stored in a Random Access Memory (RAM) 330. Processor 301 performs read and write operations in RAM memory 330 via path 331.

Figure 4:
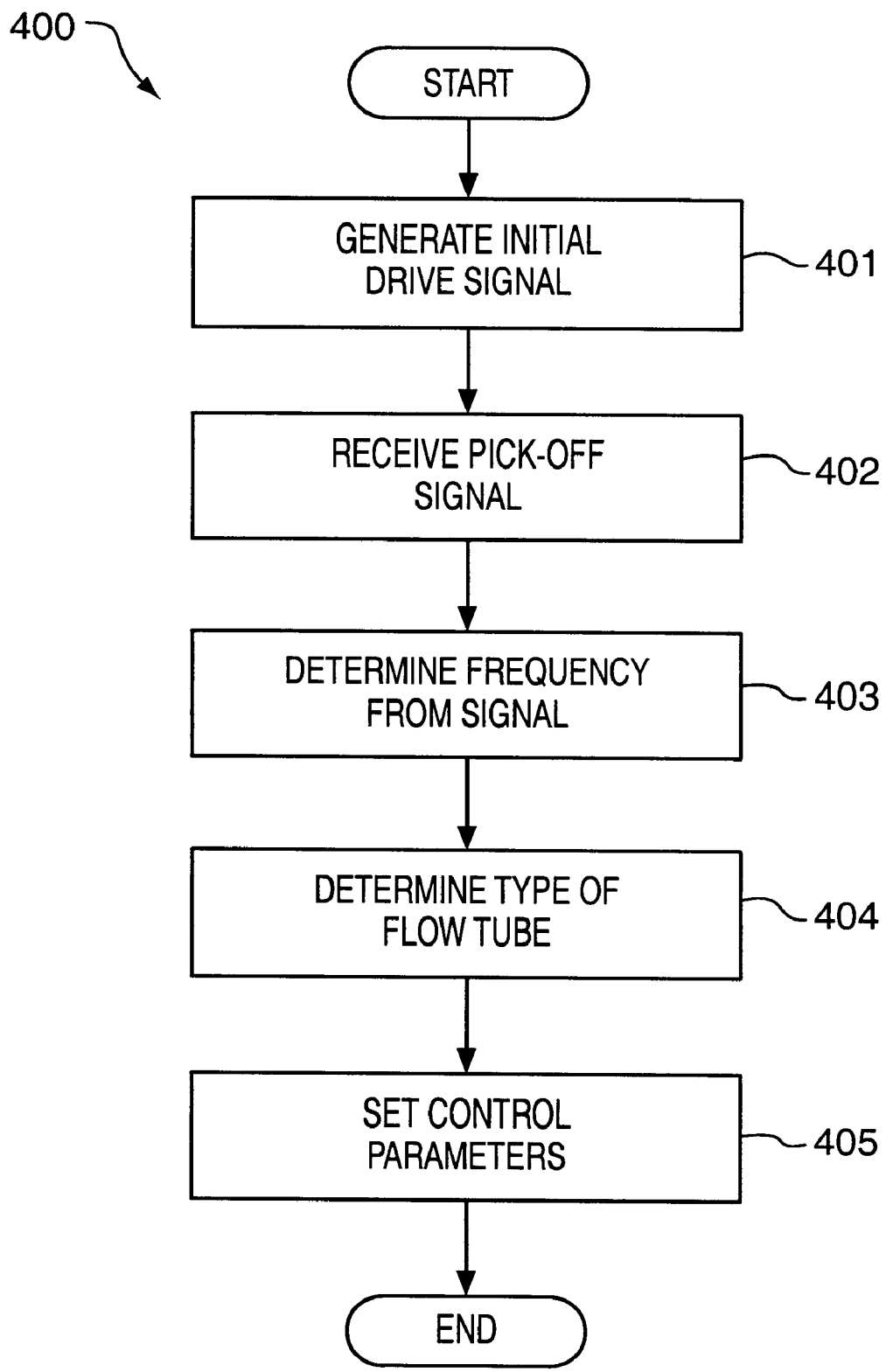
FIG. 4 illustrating a flow diagram of the operations performed by a digital transmitter to initialize the parameters.

Overview of Operation Performed by Digital Transmitter 20—FIG. 4.

FIG. 4 is an overview of the process performed by digital transmitter 20 to initialize the drive signal parameters of Coriolis flowmeter 5/25. The above is a description of a digital transmitter 20 for a Coriolis flowmeter 5/25 and the following is a description of the process performed by digital transmitter 20 to provide the system for initializing the parameters. One skilled in the art will recognize that it is possible to provide the same processes using analog circuitry.

Process 400 begins in step 401 with digital transmitter 20 generating an initial drive signal. The initial drive signal is applied to the drive circuit which in turn applies the initial drive signal to driver 104/204. Driver 104/204 causes the flow tubes 103 A-B/ 201 to vibrate. The vibration of the flow tubes is measured by pick-offs 105–105'/205–205' which apply signals to leads 111–111'/ 211–211'. The signals are received then by transmitter 20 in step 402. Transmitter 20 determines the frequency of oscillation of the flow tubes in step 403. One possible method for determining the frequency of oscillation is the use of a notch filter adaptive line estimator technique which is described in detail in a patent application titled "System for Determining Properties of a Material Flowing Through a Conduit Using a Digital Transmitter" filed on the same day as this application and assigned to MicroMotion Inc. of Boulder, Colorado. Another possible method for determining the frequency of signals is provided in U.S. Pat. No. 5,555,190 titled "Method and apparatus for adaptive line enhancement in Coriolis mass flow meter measurement," issued to Derby et al. on Sep. 10, 1996 and assigned to Micromotion Inc. of Boulder Colo.

In step 404, the type of flow tube is determined based on the frequency of oscillation of the flow tubes. One manner of doing this is to determine whether the frequency is greater than a threshold frequency. If the frequency of oscillation is above the threshold frequency, the flowmeter is of a straight tube configuration. If the frequency is less than or equal to the threshold frequency, the flowmeter has flow tubes of a curved configuration. This is known from design analysis and verified through field experimentations of the flow tubes.

In step 405, control parameters for the drive signals are set in response to a determination of the type of flowmeter. The following table is an example of the parameters set.

| Parameter | Frequency <= 300 Hz Indicating Curved Configuration | Frequency > 300 Hz Indicating Straight Flow Tube Configuration |
|---|---|---|
| milliVolts/Hz | 3.4 | 1.0 |
| $K_p$, proportional drive gain | 1000 | 2000 |
| $K_i$, integral drive gain | 5 | 5 |

Millivolts/Hz is a measurement of the drive target or set point. The proportional drive gain target is the amount of millivolts/ Hz needed to drive the flow tubes. The integral drive gain is the deviation in millivolts/ Hz that is acceptable for the signal. In the preferred exemplary embodiment, it is coincidental that the integral drive gain is the same for a straight tube and a dual tube flowmeter.

Process 400 ends after step 405. Transmitter 20 is now able to generate and maintain a stable drive control of flow tubes 103A–B or 201 based upon the type of sensor that is identified in process 400. The stable drive control is maintained based upon the unique structural dynamics of the flowmeter and provides optimum response time to extraneous input perturbations in the flowmeter.

The above is a description of a system for initializing parameters of a drive circuit. It is expected that others will design alternative systems and processes that infringe on this invention as set forth in the claims below either literally or through the Doctrine of Equivalents.

What is claimed is:

1. A method for operating a transmitter of a Coriolis flowmeter having at least one flow tube, a driver that oscillates said at least one flow tube, and sensors affixed to said at least one flow tube that produce pickoff signals representing motion of said at least one flow tube, said method comprising the steps of:

applying initial drive signals to said driver which causes said flow tube to vibrate;

determining a frequency of oscillation of said flow tube based on said pickoff signals;

determining a type of said flow tube in response to said pickoff signals indicating said frequency of oscillation of said flow tube; and setting parameters for generation of said drive signal in response to a determination of said type of said flow tube.

2. The method of claim 1 wherein said step of determining said type of said flow tube comprises the steps of:

comparing said frequency of oscillation to a threshold frequency; and determining said type of said flow tube is a straight flow tube responsive to said frequency of oscillation being greater than said threshold frequency.

3. The method of claim 2 wherein said step of determining said type of said flow tube further comprises the step of:

determining said type of said flow tube is a curved flow tube responsive to said frequency of oscillation being less than or equal to said threshold frequency.

4. A product used with a transmitter connected to a Coriolis flowmeter having at least one flow tube, a driver that oscillates said at least one flow tube, and sensors affixed to said at least one flow tube that produce pickoff signals representing motion of said at least one flow tube, said product comprising:

a processor readable media for storing instructions; and instructions for directing a processor in said product to:
- generate initial drive signals for said driver to cause said flow tube to vibrate,
- apply said drive signals to said driver which causes said flow tube to vibrate,
- determine a frequency of oscillation of said flow tube based on said pickoff signals,
- determine a type of said flow tube in response to said pickoff signals indicating said frequency of oscillation of said flow tube, and
- set parameters for generation of said drive signal in response to a determination of said type of said flow tube.

5. The product of claim 4 wherein said instructions to determine said type of said flow tube comprises:

instructions for directing said processor to:
- compare said frequency of oscillation to a threshold frequency; and
- determine said type of said flow tube is a straight flow tube responsive to said frequency of oscillation being greater than said threshold frequency.

6. The product of claim 5 wherein said instructions to determine said type of said flow tube comprises:

instructions for directing said processor to:
- determine said type of said flow tube is a curved flow tube responsive to said frequency of oscillation being less than or equal to said threshold frequency.

7. An apparatus used with a transmitter connected to a Coriolis flowmeter having at least one flow tube, a driver that oscillates said at least one flow tube, and sensors affixed to said at least one flow tube that produce pickoff signals representing motion of said at least one flow tube, said apparatus comprising:
- means for applying initial drive signals to said driver which causes said flow tube to vibrate;
- means for determining a frequency of oscillation of said flow tube based on said pickoff signals;
- means for determining a type of said flow tube in response to said pickoff signals indicating said frequency of oscillation of said flow tube; and
- means for setting parameters for generation of said drive signal in response to a determination of said type of said flow tube.

8. The apparatus of claim 10 wherein said means of determining said type of said flow tube comprises:
- means for comparing said frequency of oscillation to a threshold frequency; and
- means for determining said type of said flow tube is a straight flow tube responsive to said frequency of oscillation being greater than said threshold frequency.

9. The apparatus of claim 8 wherein said means of determining said type of said flow tube further comprises:
- means for determining said type of said flow tube is a curved flow tube responsive to said frequency of oscillation being less than or equal to said threshold frequency.

* * * * *

UNITED STATES PATENT AND TRADEMARK OFFICE
CERTIFICATE OF CORRECTION

PATENT NO.    : 6,318,186 B1
DATED         : November 11, 2001
INVENTOR(S)   : Smith, Richard L. and Smith, Brian T.

It is certified that error appears in the above-identified patent and that said Letters Patent is hereby corrected as shown below:

<u>Title page,</u>
Item [75], replace "Inventors: Richard L. Smith, Lafayette; Brian T. Smith, Johnston, both of CO (US)" with -- Inventors: Richard L. Maginnis, Lafayette; Brian T. Smith, Johnstown, both of CO (US) --

<u>Column 5,</u>
Line 4, replace "allow transmitter to receive data from and convey data to an" with
-- allow transmitter 20 to receive data from and convey data to an --

<u>Column 8,</u>
Line 16, replace "8. The apparatus of claim 10 wherein said means of" with
-- 8. The apparatus of claim 7 wherein said means of --

Signed and Sealed this

Tenth Day of September, 2002

*Attest:*

*Attesting Officer*

JAMES E. ROGAN
*Director of the United States Patent and Trademark Office*